(12) United States Patent
Tati et al.

(10) Patent No.: US 11,029,863 B2
(45) Date of Patent: Jun. 8, 2021

(54) USING NON-VOLATILE RANDOM ACCESS MEMORY AS VOLATILE RANDOM ACCESS MEMORY

(71) Applicant: VMware, Inc., Palo Alto, CA (US)

(72) Inventors: Kiran Tati, Fremont, CA (US); Preeti Agarwal, San Jose, CA (US); Julien Freche, Mountain View, CA (US); Xavier Deguillard, Mountain View, CA (US); Rajesh Venkatasubramanian, San Jose, CA (US); Ishan Banerjee, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 70 days.

(21) Appl. No.: 15/693,292

(22) Filed: Aug. 31, 2017

(65) Prior Publication Data

US 2019/0065091 A1 Feb. 28, 2019

(51) Int. Cl.
*G06F 3/06* (2006.01)
*G06F 13/16* (2006.01)
*G06F 12/02* (2006.01)
*G06F 12/08* (2016.01)
*G06F 11/34* (2006.01)
(Continued)

(52) U.S. Cl.
CPC .......... *G06F 3/0631* (2013.01); *G06F 3/0604* (2013.01); *G06F 3/0652* (2013.01); *G06F 3/0685* (2013.01); *G06F 9/45558* (2013.01); *G06F 11/34* (2013.01); *G06F 12/02* (2013.01); *G06F 12/0284* (2013.01); *G06F 12/0292* (2013.01); *G06F 12/08* (2013.01); *G06F 2009/45579* (2013.01); *G06F 2009/45583* (2013.01); *G06F 2212/152* (2013.01); *G06F 2212/214* (2013.01); *G06F 2212/225* (2013.01); *G06F 2212/502* (2013.01)

(58) Field of Classification Search
CPC .... G06F 3/0631; G06F 3/0604; G06F 3/0652; G06F 3/0685; G06F 12/02; G06F 12/0284; G06F 11/34; G06F 12/0292; G06F 9/45558; G06F 2212/214; G06F 2212/152; G06F 12/08; G06F 2009/45579; G06F 2009/45583; G06F 2212/225; G06F 2212/502; G06F 11/3034; G06F 11/3442
See application file for complete search history.

(56) References Cited

U.S. PATENT DOCUMENTS

| 6,085,296 A * | 7/2000 | Karkhanis | G06F 12/1009 |
| | | | 711/147 |
| 6,381,682 B2 * | 4/2002 | Noel | G06F 9/5077 |
| | | | 711/147 |

(Continued)

*Primary Examiner* — Charles Rones
*Assistant Examiner* — Tong B. Vo (57) ABSTRACT

Techniques for using non-volatile random access memory (NVM) as volatile random access memory (RAM) are provided. In one set of embodiments, a computer system can detect that an amount of free space in a volatile RAM of the computer system has become low and, in response, can add one or more memory pages from an unused portion of an NVM of the computer system to the system's volatile RAM pool. Conversely, the computer system can detect that an amount of free space in the NVM has become low and, in response, can return the one or more memory pages from the volatile RAM pool back to the NVM.

22 Claims, 6 Drawing Sheets

(51) Int. Cl.
  *G06F 9/455* (2018.01)
  *G06F 13/12* (2006.01)
  *G11C 29/52* (2006.01)
  *G06F 21/87* (2013.01)
  *G06F 11/10* (2006.01)

(56) References Cited

U.S. PATENT DOCUMENTS

| | | | | |
|---|---|---|---|---|
| 7,130,960 B1* | 10/2006 | Kano | ............... | G06F 3/0608 |
| | | | | 711/112 |
| 8,578,370 B2* | 11/2013 | Dai | ............... | G06F 9/45558 |
| | | | | 717/166 |
| 8,898,388 B1* | 11/2014 | Kimmel | ............... | G06F 12/0802 |
| | | | | 711/114 |
| 2005/0257020 A1* | 11/2005 | Kashyap | ............... | G06F 9/5072 |
| | | | | 711/170 |
| 2007/0118712 A1* | 5/2007 | van Riel | ............... | G06F 12/023 |
| | | | | 711/170 |
| 2010/0174860 A1* | 7/2010 | Kim | ............... | G06F 12/0246 |
| | | | | 711/112 |
| 2011/0060885 A1* | 3/2011 | Satoyama | ............... | G06F 3/0605 |
| | | | | 711/170 |
| 2011/0138147 A1* | 6/2011 | Knowles | ............... | G06F 9/5016 |
| | | | | 711/170 |
| 2013/0339572 A1* | 12/2013 | Fanning | ............... | G06F 12/1009 |
| | | | | 711/102 |
| 2014/0258670 A1* | 9/2014 | Venkatasubramanian | ............... | G06F 12/023 |
| | | | | 711/171 |
| 2016/0117260 A1* | 4/2016 | Wu | ............... | G06F 21/79 |
| | | | | 713/193 |
| 2016/0196158 A1* | 7/2016 | Nipane | ............... | G06F 9/45558 |
| | | | | 718/1 |
| 2018/0067682 A1* | 3/2018 | Sofia | ............... | G06F 12/12 |

* cited by examiner

USING NON-VOLATILE RANDOM ACCESS MEMORY AS VOLATILE RANDOM ACCESS MEMORY

BACKGROUND

Non-volatile random access memory (NVM) is an emerging computer memory technology that offers fast, byte-level access to data in a manner similar to volatile random access memory (e.g., DRAM), but is persistent in nature (i.e., the contents of the memory are saved when system power is turned off or lost). NVM can be broadly classified into two types: NVDIMM-P and NVDIMM-N. NVDIMM-P makes use of a new class of physical memory, marketed under various names such as 3D XPoint, Crystal Ridge, etc., that can natively persist the data stored in its memory cells. On the other hand, NVDIMM-N makes use of traditional DRAM and an on-board or on-chip battery. When system power is turned off or lost, the battery powers the NVDIMM-N module for a short period of time, which enables the DRAM contents to be persisted to a non-volatile storage device (e.g., a flash memory device).

In existing implementations, the NVM that is installed in a computer system and exposed to the system's operating system (OS) or hypervisor is used by the OS/hypervisor as a storage device. This exploits the persistent nature of NVM and leverages the fact that NVM, and in particular NVDIMM-P, is available in higher capacities than DRAM. However, since storage devices are typically over-provisioned and filled up slowly over time, the use of NVM as a storage device can result in scenarios where the NVM's capacity is under-utilized for a significant part of its life.

SUMMARY

Techniques for using non-volatile random access memory (NVM) as volatile random access memory (RAM) are provided. In one set of embodiments, a computer system can detect that an amount of free space in a volatile RAM of the computer system has become low and, in response, can add one or more memory pages from an unused portion of an NVM of the computer system to the system's volatile RAM pool. Conversely, the computer system can detect that an amount of free space in the NVM has become low and, in response, can return the one or more memory pages from the volatile RAM pool back to the NVM.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes techniques that can be implemented by the OS or hypervisor of a computer system for dynamically repurposing unused space in the system's NVM as volatile RAM (e.g., DRAM). With these techniques, the OS/hypervisor can take advantage of the fact that NVM is often under-utilized when used as storage to increase the total amount of effective volatile RAM (and thus main memory) in the computer system.

For example, in one set of embodiments the OS/hypervisor can detect when the amount of free volatile RAM in the computer system has become low and, in response, can add a portion of the unused capacity of the NVM (i.e., one or more free NVM memory pages) to the system's volatile RAM pool. Once added, the OS/hypervisor can allocate these NVM memory pages to user-level processes such as applications, virtual machines (VMs), etc. in a transparent manner, and the user-level processes can use the NVM memory pages as they would use pages from system DRAM.

Conversely, the OS/hypervisor can detect when the amount of free NVM in the computer system has become low and, in response, can evict one or more NVM memory pages previously added to the volatile RAM pool, thereby returning those pages to the NVM for storage purposes. As part of this eviction process, the evicted pages can be remapped to the system's volatile RAM if there is sufficient free space there, or can be reclaimed via page sharing, compression, ballooning, swapping, or the like. Alternatively, in embodiments where the computer system is a host system running VMs and is a member of a cluster, a cluster management agent can migrate one or more VMs that are using the evicted pages to another host system in the cluster with sufficient free volatile RAM, thereby avoiding the performance hit of memory reclamation on the original host system.

The foregoing and other aspects of the present disclosure are described in further detail below.

2. Example Computer System

Figure 1:
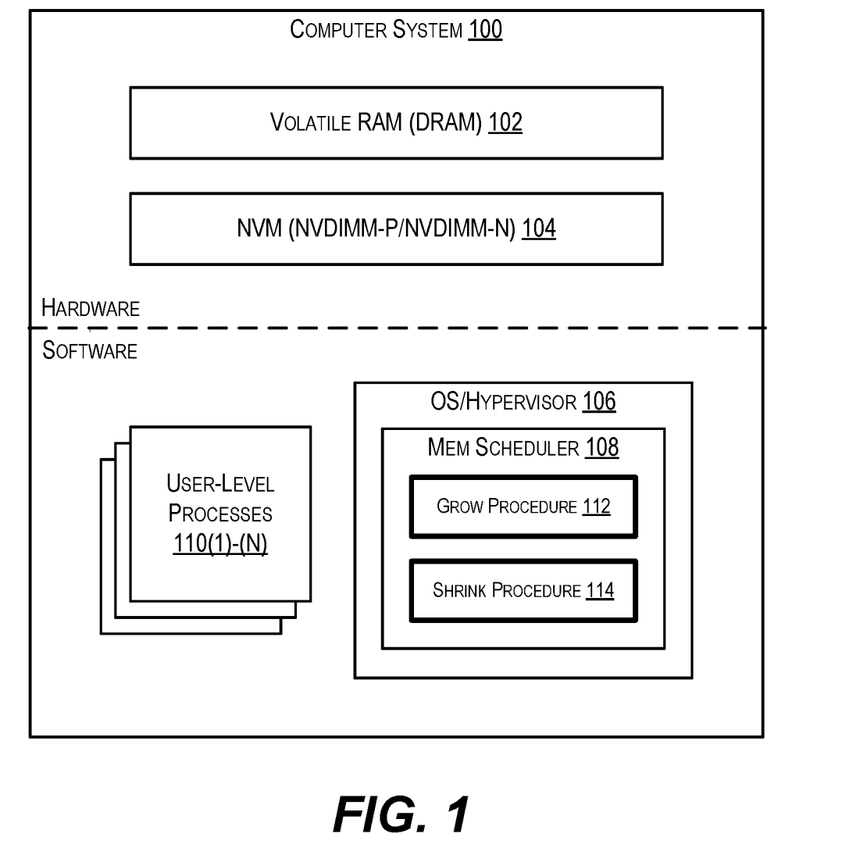
FIG. 1 depicts an example computer system in which embodiments of the present disclosure may be implemented.

FIG. 1 is a simplified block diagram of a computer system 100 in which embodiments of the present disclosure may be implemented. As shown, computer system 100 includes, in hardware, one or more volatile RAM modules 102 and one or more non-volatile RAM (NVM) modules 104. Volatile RAM 102 may comprise traditional dynamic RAM (DRAM) while NVM 104 may comprise NVDIMM-N, NVDIMM-P, a combination of the two, and/or any other NVM technology that may be developed in future.

Computer system 100 further includes, in software, an OS or hypervisor 106, a memory scheduler 108 within OS/hypervisor 106, and a number of user-level processes (e.g., applications or VMs) 110(1)-(N). Generally speaking, memory scheduler 108 is configured to manage the use of volatile RAM 102 by memory consumers such as OS/hypervisor 106 and user-level processes 110(1)-(N). For instance, among other things, memory scheduler 108 can maintain information regarding the amount of free space in volatile RAM 102. When this amount becomes "low" (as determined by one or more criteria), memory scheduler 108 can carry out one or more actions to bring the amount of free volatile RAM back to an acceptable level.

As noted in the Background section, in existing implementations NVM 104 is leveraged as a storage device by OS/hypervisor 106. More particularly, a BIOS of computer system 100 determines the total capacity of NVM 104 at system boot time and exposes this capacity as an "NVM device" to OS/hypervisor 106. In the case of NVDIMM-P, the NVM device capacity corresponds to the total capacity of the NVDIMM-P modules. In the case of NVDIMM-N, the NVM device capacity corresponds to a user-defined portion of the DRAM on the NVDIMM-N modules (the remaining portion is used as regular DRAM). OS/hypervisor 106 identifies the NVM device exposed by the BIOS as a storage device and allows storage consumers, such as user-level processes 110(1)-(N), to carve out storage regions (each comprising a number of NVM memory pages) in NVM 104. The storage consumers then perform storage I/O against the storage regions. Unfortunately, while this approach of using NVM 104 as storage is useful (particularly for workloads that require fast storage performance), it is also inefficient because it often results in under-utilization of NVM 104's total capacity.

Figure 2:
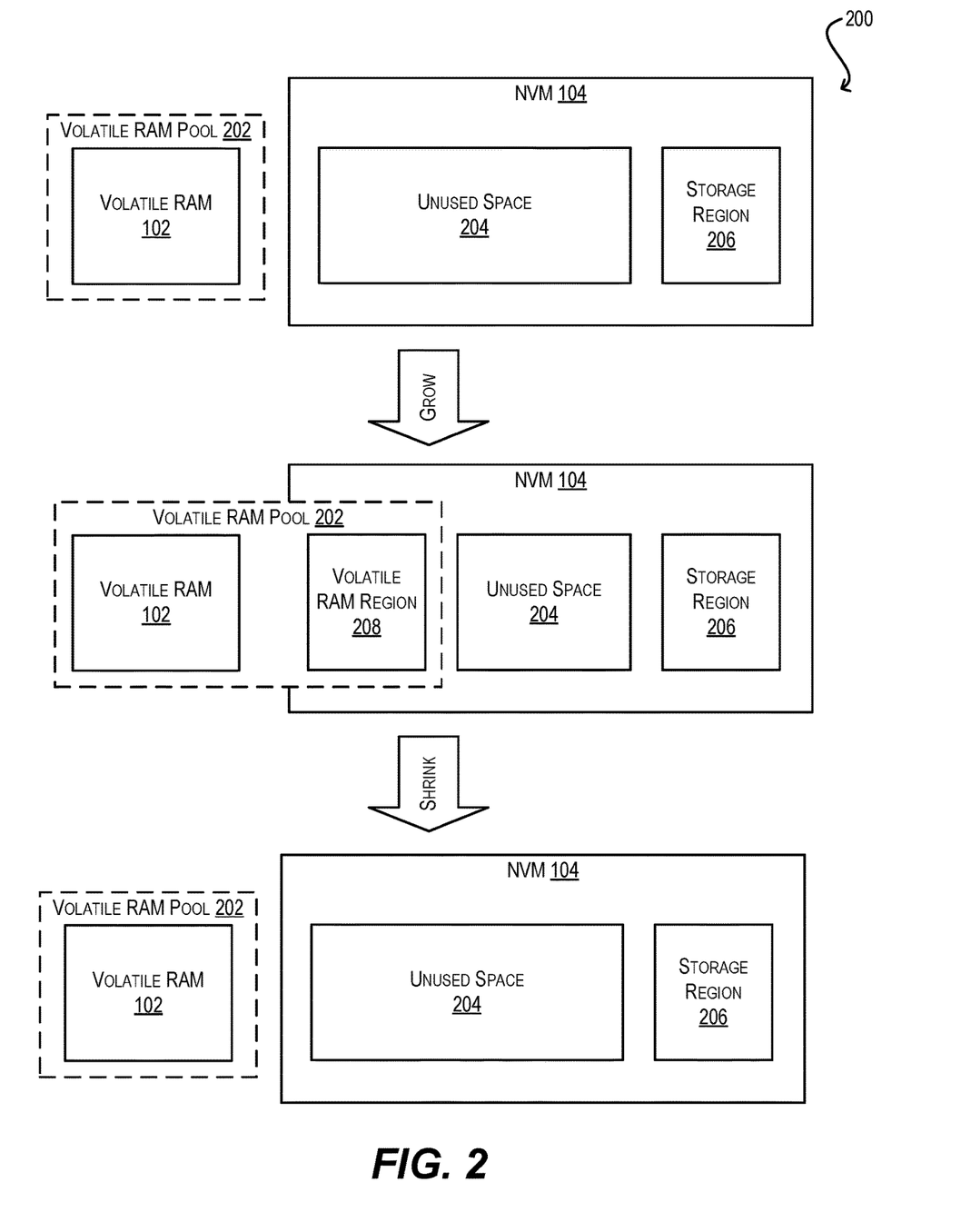
FIG. 2 is a schematic diagram illustrating the use of free NVM to grow and shrink volatile RAM according to an embodiment.

To address this inefficiency, memory scheduler 108 is enhanced to include a novel "grow" procedure 112 and a novel "shrink" procedure 114 as shown in FIG. 1. At a high level, grow procedure 112 can transparently add unused memory pages in NVM 104 to the volatile RAM capacity (i.e., "volatile RAM pool") of computer system 100 when free volatile RAM becomes low. Further, shrink procedure 114 can gracefully return the NVM memory pages added to the volatile RAM pool via grow procedure 112 back to NVM 104 when free NVM becomes low. The effects of these procedures are illustrated schematically in diagram 200 of FIG. 2—in particular, the top section of diagram 200 depicts an initial representation of NVM 104 and the system's volatile RAM pool 202 prior to execution of grow procedure 112 (where NVM 104 includes unused space 204 and an existing storage region 206); the middle section depicts a representation of NVM 104 and volatile RAM pool 202 after execution of grow procedure 112 (where a volatile RAM region 208 has been carved out of unused NVM space 204 and added to volatile RAM pool 202); and the bottom section depicts a representation of NVM 104 and volatile RAM pool 202 after execution of shrink procedure 114 (where volatile RAM region 208 has been removed from volatile RAM pool 202 and incorporated back into unused NVM space 204).

Taken together, grow procedure 112 and shrink procedure 114 can exploit the under-utilized capacity of NVM 104 to dynamically modulate the amount of effective volatile RAM in computer system 100 on an as-needed basis. This, in turn, can advantageously improve the performance of computer system 100 by, e.g., allowing for a higher VM consolidation ratio, enabling system 100 to run more memory-intensive applications, and so on. Details for implementing grow procedure 112 and shrink procedure 114 are described in sections (3) and (4) respectively below.

It should be appreciated that computer system 100 of FIG. 1 is illustrative and not intended to limit embodiments of the present disclosure. For example, the various components shown in FIG. 1 may be organized according to different arrangements or configurations, and may include subcomponents or functions that are not specifically described. One of ordinary skill in the art will recognize other variations, modifications, and alternatives.

3. Growing the Volatile RAM Pool

Figure 3:
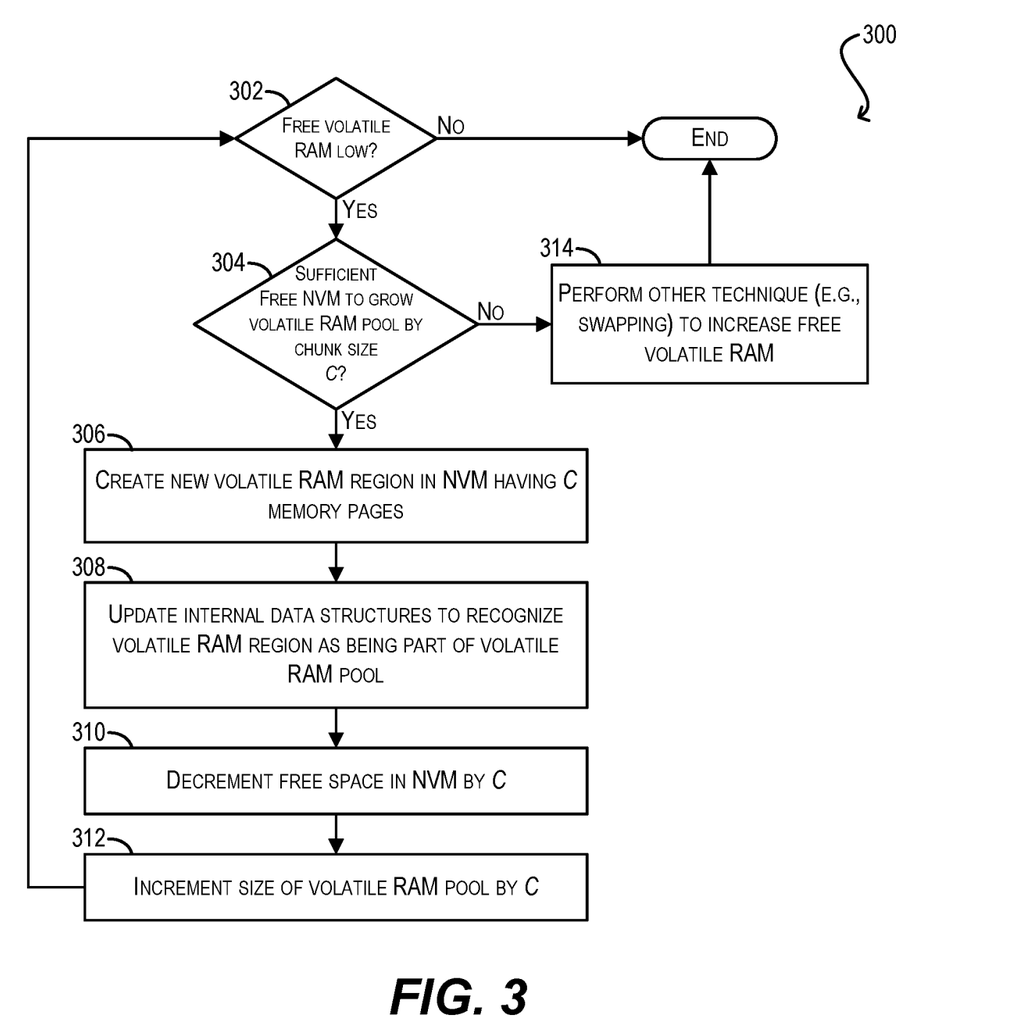
FIG. 3 depicts a workflow for implementing the grow procedure according to an embodiment.

FIG. 3 depicts a workflow 300 that can be executed by memory scheduler 108 of FIG. 1 for implementing grow procedure 112 according to an embodiment. Memory scheduler 108 can perform workflow 300/grow procedure 112 on a periodic basis in order to keep the amount of free volatile RAM in computer system 100 at an acceptable level.

Starting with block 302, memory scheduler 108 can check whether the amount of free volatile RAM in computer system 100 is "low," where the definition of "low" may vary depending on the implementation of memory scheduler 108. For example, in one embodiment, memory scheduler 108 can maintain a state indicator regarding the free volatile RAM level of system 100 (which may be based on various qualitative and/or quantitative factors) and can determine that the amount of free volatile RAM is low if this state indicator is not an expected value. In other embodiments, memory scheduler 108 can simply check whether the amount of free volatile RAM has fallen below a predefined threshold.

If memory scheduler 108 determines at block 302 that free volatile RAM is not low, memory scheduler 108 can conclude that there is no need to grow the volatile RAM pool at this point in time and workflow 300 can end.

However, if memory scheduler 108 determines at block 302 that free volatile RAM is low, memory scheduler 108 can further check whether there is a sufficient amount of free space in NVM 104 to grow the volatile RAM pool by a "growth chunk" size of C NVM memory pages (block 304). This step can comprise, e.g., validating whether the current number of free memory pages in NVM 104 minus C is greater than or equal to a user-defined value M, where M is a minimum number of free memory pages that should be maintained in NVM 104 at all times.

If memory scheduler 108 determines at block 304 that there is sufficient free NVM, memory scheduler 108 can create a new region (referred to as a "volatile RAM region") in NVM 104 having size C (block 306). Memory scheduler 108 can then update its internal data structures to recognize the newly created volatile RAM region as being part of computer system 100's volatile RAM pool (thereby enabling the NVM memory pages in this region to be used by memory consumers) (block 308), decrement the free space in NVM 104 by C (block 310), increment the size of the volatile RAM pool by C (block 312), and return to block 302 to check whether the amount of free volatile RAM is still low. If so, memory scheduler 108 can repeat blocks 304-312 in order to further grow the volatile RAM pool using an additional chunk of C free NVM memory pages (if possible). Throughout this growth process, the total published capacity of NVM 104 can remain unchanged and storage consumers can continue using NVM 104 as a storage device.

On the other hand, if memory scheduler 108 determines at block 304 that there is insufficient free NVM, memory scheduler 108 can perform one or more other techniques (e.g., swapping, etc.) to increase the free volatile RAM of computer system 100 to an acceptable level (block 314) and workflow 300 can end.

4. Shrinking the Volatile RAM Pool

Figure 4:
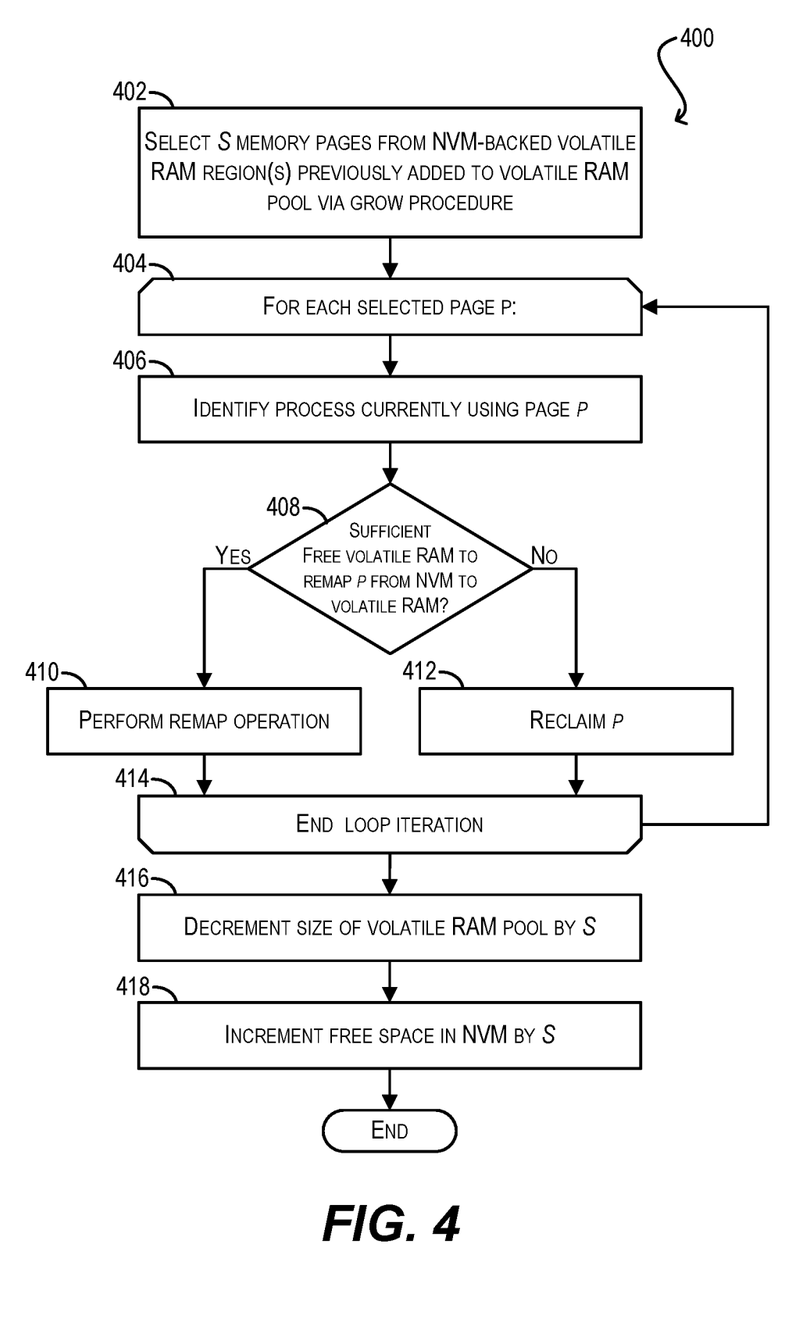
FIG. 4 depicts a workflow for implementing the shrink procedure according to an embodiment.

FIG. 4 depicts a workflow 400 that can be executed by memory scheduler 108 of FIG. 1 for implementing shrink procedure 114 according to an embodiment. Generally speaking, workflow 400/shrink procedure 114 will be triggered when the amount of free space in NVM 104 falls to a level that requires NVM memory pages previously added to the volatile RAM pool via workflow 300/grow procedure 112 to be returned to NVM 104 for storage purposes. This may occur if, e.g., the amount of free NVM falls below a predefined threshold, or a storage consumer attempts to create a new storage region in NVM 104 whose size exceeds the amount of free NVM.

Starting with block 402, memory scheduler 108 can select S memory pages from the NVM-backed volatile RAM region(s) previously added to the volatile RAM pool via workflow 300/grow procedure 112, where S is the desired "shrink size" for the current run of shrink procedure 114 (note that this shrink size will typically be different from the growth chunk size discussed with respect to workflow 300). Memory scheduler 108 can perform the page selection at block 402 using any of a number of methods (e.g., random select, FIFO, etc.).

At block 404, memory scheduler 108 can enter a loop for evicting each selected page p from the NVM-backed volatile RAM region(s). Within this loop, memory scheduler 108 can identify the process (e.g., application, VM, etc.) currently using page p (block 406) and check whether there is sufficient free volatile RAM to remap p from NVM 104 to volatile RAM 102 (block 408). If so, memory scheduler 108 can perform the remap operation (block 410); otherwise, memory scheduler 108 can reclaim p using a memory reclamation technique (e.g., page sharing, compression, swapping, etc.) (block 412). Memory scheduler 108 can then reach the end of the current loop iteration (block 414) and return to block 404 in order to evict additional pages in the set of selected pages.

Once all S memory pages have been evicted, memory scheduler 108 can decrement the size of the volatile RAM pool by S (block 416) and increment the amount of free space in NVM 104 by S (block 418). Workflow 400 can subsequently end.

It should be noted that remapping each page p from NVM 104 to volatile RAM 102 at block 410 is preferable to reclaiming the page at block 412, since memory reclamation typically incurs a performance penalty. In a single machine scenario, there is generally no way to avoid this performance penalty if there is insufficient free space in volatile RAM 102 to perform the remapping operation. However, in scenarios where computer system 100 is a host system that is part of a cluster, it is possible to migrate one or more VMs that are using the evicted memory pages to another host system in the cluster that has sufficient volatile RAM, thereby avoiding the performance hit of memory reclamation. This alternative is discussed in section (6) below.

5. Representing NVM as Volatile RAM

There are various ways in which memory scheduler 108 can represent the NVM-created volatile RAM region(s) created at block 306 of workflow 300 as volatile RAM that is available for use by memory consumers. For example, in certain embodiments memory scheduler 108 may maintain a hierarchical resource tree that represents a hierarchy between memory consumers. The root of the tree initially represents all of the volatile RAM in the computer system and that volatile RAM is then distributed as new consumers are added to the tree. In these embodiments, memory scheduler 108 can add the NVM-backed volatile RAM region(s) to the root and this newly added memory will be automatically distributed to memory consumers.

In some cases, it may be beneficial to limit the memory consumers that can use the NVM-backed volatile RAM region to user-level processes only, such as applications or VMs. This is because memory reclamation (which may be needed as part of shrink process 114) cannot be performed for memory that is used by kernel-level clients. To enforce this limitation, the NVM-backed volatile RAM region(s) can be placed in a special group/node that is a sibling of user-level processes in the hierarchical resource tree. This can enable those user-level processes to "steal" memory pages from this special group/node on an as-needed basis and thereby make use of the NVM-backed volatile RAM as conventional DRAM, while preventing kernel-level clients from accessing the NVM-backed memory.

6. Cluster Considerations

Figure 5:
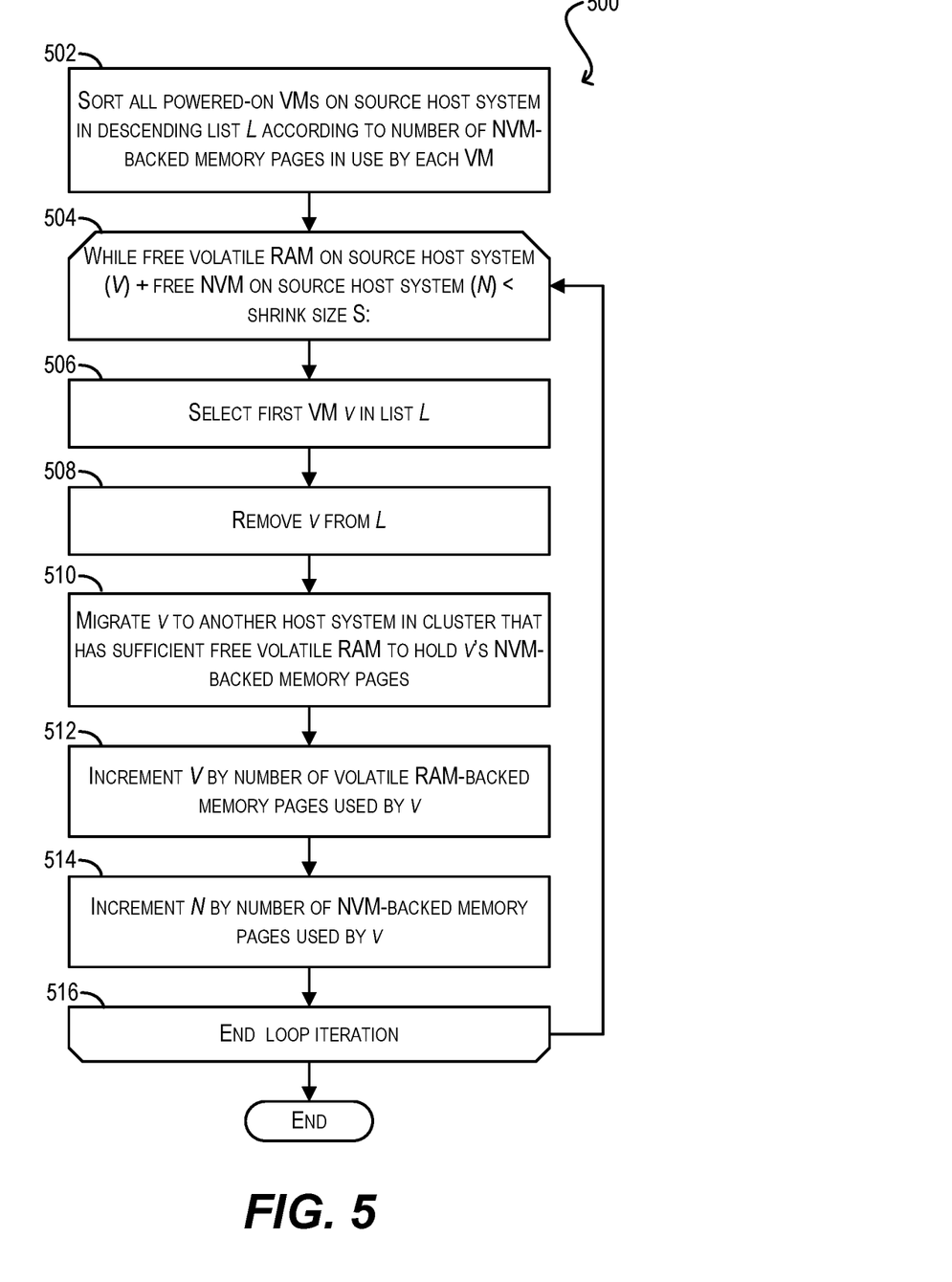
FIG. 5 depicts a workflow for migrating VMs between host systems in a cluster to avoid memory reclamation during the shrink procedure according to an embodiment.

As mentioned previously, in scenarios where computer system 100 is a host system that runs one or more VMs and is part of a cluster, it is possible to avoid the memory reclamation performed at block 412 of workflow 400 by migrating VM(s) that are using NVM-backed memory pages (i.e., memory pages in NVM-backed volatile RAM regions created via grow procedure 112) to another host system in the cluster which has enough free volatile RAM to hold the VM(s)' NVM-backed data. FIG. 5 depicts a workflow 500 of this migration process according to an embodiment. Workflow 500 can be executed immediately prior to workflow 400/shrink procedure 114 by a cluster-level management agent (e.g., VMware Inc.'s Distributed Resource Scheduler (DRS)) that is responsible for various cluster-wide management operations such as powering on VMs in the cluster, creating new NVM regions for storage use, and so on. Workflow 500 assumes that this management agent has a complete view of the free volatile RAM and free NVM of all host systems in the cluster.

At block 502, the management agent can first sort all of the powered-on VMs on computer system 100 (i.e., the "source host system") in, e.g., a descending list L according to how may NVM-backed memory pages are in use by each VM (note that any sorting order may be used, as long as the management agent can identify the VMs by the number of NVM-backed memory pages used by each VM). At block 504, the management agent can enter a loop that iterates while the amount of free volatile RAM on the source host system (V) plus the amount of free NVM on the source host system (N) is less than shrink size S.

Within the loop, the management agent can select the first VM v in list L (block 506), remove v from L (block 508), and migrate v to another host system in the cluster (i.e., a "destination host system") that has sufficient free volatile RAM to hold v's memory pages (block 510). As part of block 510, the management agent may need to power-on or resume (from suspend) the destination host system. The management agent can further increment V by the number of volatile RAM-backed memory pages used by v (block 512) and increment N by the number of NVM-backed memory pages used by v (block 514). The management agent can then reach the end of the current loop iteration (block 516) and repeat the loop until there is sufficient free volatile RAM plus free NVM (i.e., V+N) to shrink the volatile RAM pool by shrink size S without requiring memory reclamation. Once this condition is satisfied, workflow 500 can end.

Figure 6:
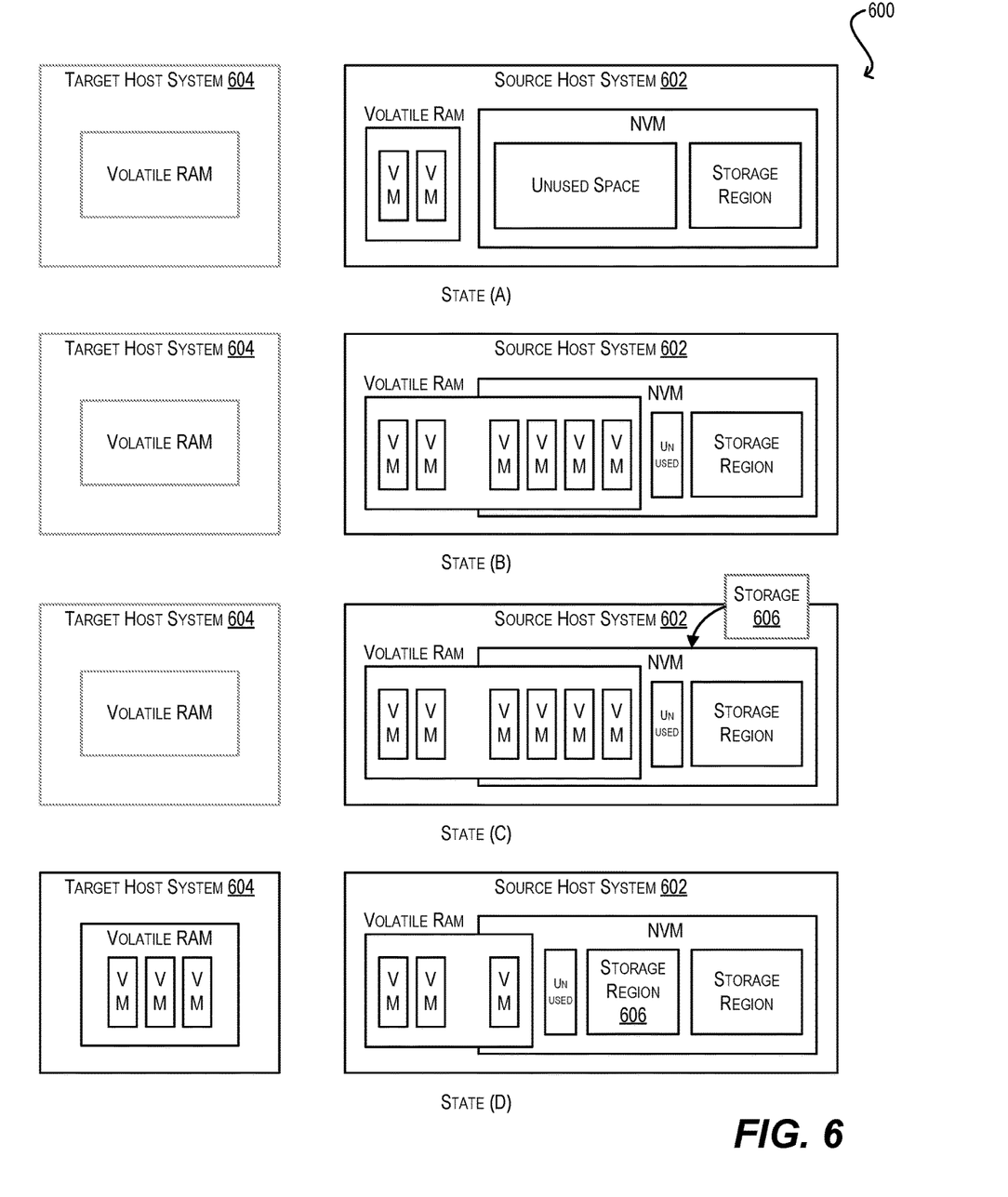
FIG. 6 is a schematic diagram illustrating states of a cluster undergoing the VM migration workflow of FIG. 5 according to an embodiment.

FIG. 6 is a diagram 600 that depicts, in schematic form, states (a)-(d) of a cluster comprising a source host system 602 and a target host system 604 before, during, and after the execution of an example migration process per workflow 500. As shown at state (a), target host system 604 is powered off while source host system 602 has two powered-on VMs in volatile RAM and an NVM device with ample unused space (and an existing storage region). At state (b), the OS/hypervisor of source host system 602 grows its volatile RAM pool by adding an NVM-backed volatile RAM region to the pool via grow procedure 112 and uses the NVM-backed volatile RAM to power-on four additional VMs. At state (c), a storage consumer attempts to create a new storage region 606 on the NVM device of source host system 602. Finally, at state (d), target host system 604 is powered-on by the cluster-level management agent and three VMs are migrated from source host system 602 to target host system 604, thereby allowing the NVM memory pages previously used by those three VMs on source host system 602 to be returned to the NVM device (via shrink procedure 114) and used for creating new storage region 606.

In certain embodiments, to ensure that there is sufficient volatile RAM available in the cluster to migrate a VM from a source host to a destination host and thus avoid memory reclamation on the source host, the management agent can enforce the following constraint, where V is the set of powered-on VMs in the cluster and M is the total effective volatile RAM (e.g., physical DRAM+NVM) of all powered-on or powered-off host systems in the cluster:

$$\sum_{v \in V} memsize(v) \leq M$$

An admission control component of the management agent can enforce this constraint each time a VM is powered-on in the cluster.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
    detecting, by a computer system, that an amount of free space in a volatile random access memory (RAM) pool of the computer system has become low;
    in response to detecting that the amount of free space in the volatile RAM pool has become low, determining whether there is sufficient free space in a non-volatile random access memory (NVM) of the computer system to grow the volatile RAM pool by a chunk size of C memory pages;
    if there is insufficient free space in the NVM to grow the volatile RAM pool by the chunk size of C memory pages, freeing one or more memory pages in the volatile RAM pool using page swapping; and
    if there is sufficient free space in the NVM to grow the volatile RAM pool by the chunk size of C memory pages:
        creating a volatile RAM region in the NVM comprising C NVM memory pages;
        updating one or more internal data structures of a memory scheduler of the computer system to recognize the volatile RAM region in the NVM as being part of the volatile RAM pool;
subsequently to the updating, detecting that an amount of free space in the NVM has become low; and
in response to detecting that the amount of free space in the NVM has become low:
selecting S NVM memory pages from the volatile RAM region in the NVM, wherein S is different from C, and
for each of the selected S NVM memory pages:
identifying a process of the computer system that is currently using the NVM memory page; and
if there is sufficient free space in the volatile RAM pool, remapping contents of the NVM memory page from the volatile RAM region in the NVM to the volatile RAM pool.

2. The method of claim 1 wherein the detecting that the amount of free space in the volatile RAM pool has become low is based on a value of a free state indicator associated with the volatile RAM pool.

3. The method of claim 1
wherein the computer system detects that the amount of free space in the NVM has become low by either:
determining that a storage consumer is attempting to create a new storage region in the NVM whose size exceeds the amount of free space in the NVM; or
determining that the amount of free space in the NVM is below a predefined threshold.

4. The method of claim 1 further comprising, if there is sufficient free space in the NVM to grow the volatile RAM pool by the chunk size of C memory pages:
decrementing the amount of free space in the NVM by the C NVM memory pages; and
incrementing a size of the volatile RAM pool by the C NVM memory pages.

5. The method of claim 1 wherein updating the one or more internal data structures of the memory scheduler comprises:
adding the volatile RAM region in the NVM to a root of a hierarchical resource tree maintained by the memory scheduler; and
creating a new node in the hierarchical resource tree that corresponds to the volatile RAM region in the NVM, wherein the new node is created as a sibling of one or more user-level processes.

6. The method of claim 1 wherein if there is insufficient free space in the volatile RAM pool to remap the contents of the NVM memory page from the NVM to the volatile RAM pool, the method further comprises:
reclaiming the NVM memory page using a memory reclamation technique.

7. The method of claim 1 wherein the computer system is a host system configured to run a plurality of virtual machines (VMs) as part of a cluster, and wherein if there is insufficient free space in the volatile RAM pool to remap the contents of the NVM memory page from the NVM to the volatile RAM pool, the method further comprises:
sorting the plurality of VMs in a descending list according to a number of NVM memory pages in the volatile RAM region in use by each VM;
selecting a first VM in the descending list; and
migrating the first VM to another host system in the cluster that has sufficient free volatile RAM to hold all data in the NVM memory pages in use by the first VM.

8. The method of claim 1 wherein the NVM comprises one or more NVDIMM-N modules, each NVDIMM-N module including one or more volatile RAM chips and a battery for powering the NVDIMM-N module when the computer system loses power.

9. A non-transitory computer readable storage medium having stored thereon program code executable by a computer system, the program code embodying a method comprising:
detecting, by a computer system, that an amount of free space in a volatile random access memory (RAM) pool of the computer system has become low;
in response to detecting that the amount of free space in the volatile RAM pool has become low, determining whether there is sufficient free space in a non-volatile random access memory (NVM) of the computer system to grow the volatile RAM pool by a chunk size of C memory pages;
if there is insufficient free space in the NVM to grow the volatile RAM pool by the chunk size of C memory pages, freeing one or more memory pages in the volatile RAM pool using page swapping; and
if there is sufficient free space in the NVM to grow the volatile RAM pool by the chunk size of C memory pages:
creating a volatile RAM region in the NVM comprising C NVM memory pages;
updating one or more internal data structures of a memory scheduler of the computer system to recognize the volatile RAM region in the NVM as being part of the volatile RAM pool;
subsequently to the updating, detecting that an amount of free space in the NVM has become low; and
in response to detecting that the amount of free space in the NVM has become low:
selecting S NVM memory pages from the volatile RAM region in the NVM, wherein S is different from C; and
for each of the selected S NVM memory pages:
identifying a process of the computer system that is currently using the NVM memory page; and
if there is sufficient free space in the volatile RAM pool, remapping contents of the NVM memory page from the volatile RAM region in the NVM to the volatile RAM pool.

10. The non-transitory computer readable storage medium of claim 9 wherein the detecting that the amount of free space in the volatile RAM pool has become low is based on a free state indicator associated with the volatile RAM pool.

11. The non-transitory computer readable storage medium of claim 9 wherein the computer system detects that the amount of free space in the NVM has become low by either:
determining that a storage consumer is attempting to create a new storage region in the NVM whose size exceeds the amount of free space in the NVM; or
determining that the amount of free space in the NVM is below a predefined threshold.

12. The non-transitory computer readable storage medium of claim 9 wherein the method further comprises, if there is sufficient free space in the NVM to grow the volatile RAM pool by the chunk size of C memory pages:
decrementing the amount of free space in the NVM by the C NVM memory pages; and
incrementing a size of the volatile RAM pool by the C NVM memory pages.

13. The non-transitory computer readable storage medium of claim 9 wherein updating the one or more internal data structures of the memory scheduler comprises:

adding the volatile RAM region in the NVM to a root of a hierarchical resource tree maintained by the memory scheduler; and creating a new node in the hierarchical resource tree that corresponds to the volatile RAM region in the NVM, wherein the new node is created as a sibling of one or more user-level processes.

14. The non-transitory computer readable storage medium of claim 9 wherein if there is insufficient free space in the volatile RAM pool to remap the contents of the NVM memory page from the NVM to the volatile RAM pool, the method further comprises:

reclaiming the NVM memory page using a memory reclamation technique.

15. The non-transitory computer readable storage medium of claim 9 wherein the computer system is a host system configured to run a plurality of virtual machines (VMs) as part of a cluster, and wherein if there is insufficient free space in the volatile RAM pool to remap the contents of the NVM memory page from the NVM to the volatile RAM pool, the method further comprises:

sorting the plurality of VMs in a descending list according to a number of NVM memory pages in the volatile RAM region in use by each VM;

selecting a first VM in the descending list; and migrating the first VM to another host system in the cluster that has sufficient free volatile RAM to hold all data in the NVM memory pages in use by the first VM.

16. A computer system comprising:

a volatile random access memory (RAM) pool;

a non-volatile random access memory (NVM) that allows for byte-addressable access to data in a manner similar to volatile RAM;

a processor; and a non-transitory computer readable medium having stored thereon program code that, when executed, causes the processor to:

detect that an amount of free space in the volatile RAM pool has become low;

in response to detecting that the amount of free space in the volatile RAM pool has become low, determine whether there is sufficient free space in the NVM to grow the volatile RAM pool by a chunk size of C memory pages;

if there is insufficient free space in the NVM to grow the volatile RAM pool by the chunk size of C memory pages, free one or more memory pages in the volatile RAM pool using page swapping; and if there is sufficient free space in the NVM to grow the volatile RAM pool by the chunk size of C memory pages:

create a volatile RAM region in the NVM comprising C NVM memory pages;

update one or more internal data structures of a memory scheduler of the computer system to recognize the volatile RAM region in the NVM as being part of the volatile RAM pool;

subsequently to the updating, detect that an amount of free space in the NVM has become low; and in response to detecting that the amount of free space in the NVM has become low:

select S NVM memory pages from the volatile RAM region in the NVM, wherein S is different from C; and for each of the selected S NVM memory pages:

identify a process of the computer system that is currently using the NVM memory page; and if there is sufficient free space in the volatile RAM pool, remap contents of the NVM memory page from the volatile RAM region in the NVM to the volatile RAM pool.

17. The computer system of claim 16 wherein the program code that causes the processor to detect that the amount of free space in the volatile RAM pool has become low is based on a value of a free state indicator associated with the volatile RAM pool.

18. The computer system of claim 16 wherein the processor detects that the amount of free space in the NVM has become low by either:

determining that a storage consumer is attempting to create a new storage region in the NVM whose size exceeds the amount of free space in the NVM; or determining that the amount of free space in the NVM is below a predefined threshold.

19. The computer system of claim 16 wherein the program code further causes the processor to, if there is sufficient free space in the NVM to grow the volatile RAM pool by the chunk size of C memory pages:

decrement the amount of free space in the NVM by the C NVM memory pages; and increment a size of the volatile RAM pool by the C NVM memory pages.

20. The computer system of claim 16 wherein the program code that causes the processor to update the one or more internal data structures of the memory scheduler comprises program code that causes the processor to:

add the volatile RAM region in the NVM to a root of a hierarchical resource tree maintained by the memory scheduler; and create a new node in the hierarchical resource tree that corresponds to the volatile RAM region in the NVM, wherein the new node is created as a sibling of user-level processes.

21. The computer system of claim 16 wherein if there is insufficient free space in the volatile RAM pool to remap the contents of the NVM memory page from the NVM to the volatile RAM pool, the program code further causes the processor to:

reclaim the NVM memory page using a memory reclamation technique.

22. The computer system of claim 16 wherein the computer system is a host system configured to run a plurality of virtual machines (VMs) as part of a cluster, and wherein if there is insufficient free space in the volatile RAM pool to remap the contents of the NVM memory page from the NVM to the volatile RAM pool, the program code further causes the processor to:

sort the plurality of VMs in a descending list according to a number of NVM memory pages in the volatile RAM region in use by each VM;

select a first VM in the descending list; and migrate the first VM to another host system in the cluster that has sufficient free volatile RAM to hold all data in the NVM memory pages in use by the first VM.

* * * * *